Michael H Collins' Apparatus for forming Glass Chimneys
No. 119,222.  Fig 1.  Patented Sep. 26, 1871.
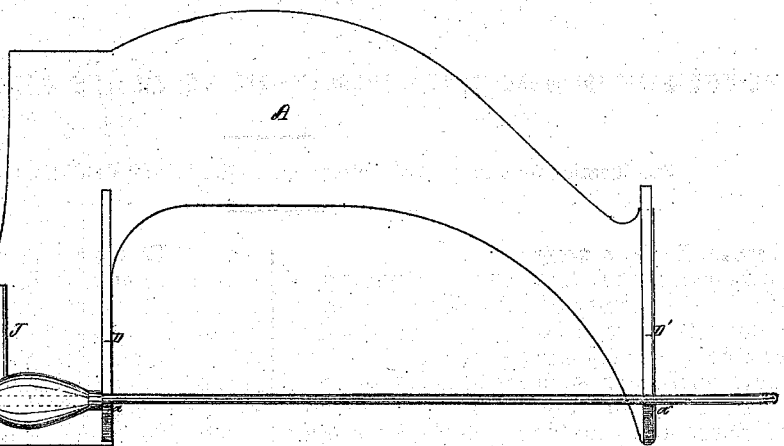
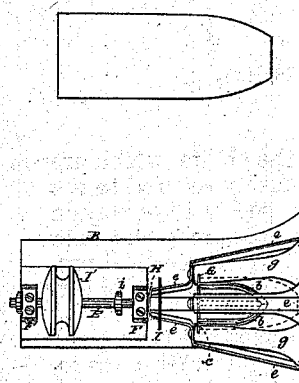
Fig. 8.
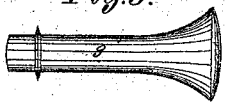
Fig. 2.
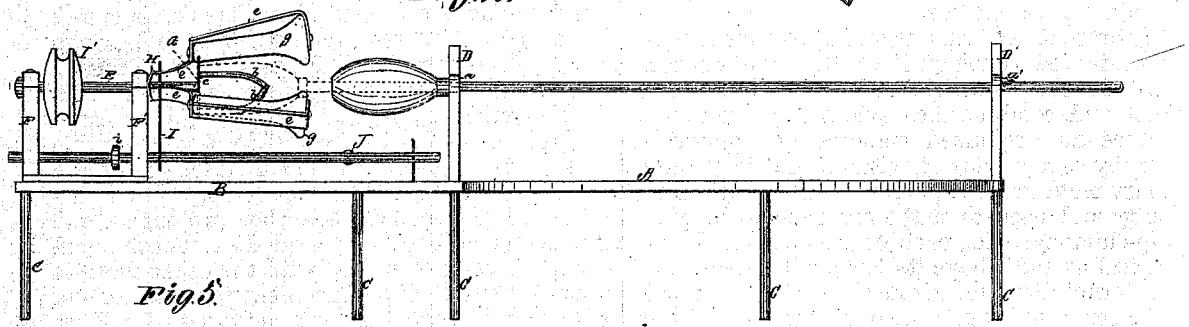
Fig. 5.
Fig. 6.
Fig. 3.
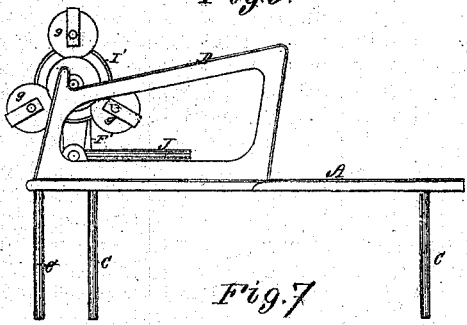
Witnesses.  Fig. 7.  Inventor
W G Russell            M H Collins
J E Robb
AM. PHOTO-LITHOGRAPHIC CO. N.Y. (OSBORNE'S PROCESS.)

UNITED STATES PATENT OFFICE.

MICHAEL H. COLLINS, OF CHELSEA, MASSACHUSETTS.

IMPROVEMENT IN MACHINES FOR FORMING GLASS CHIMNEYS FOR LAMPS.

Specification forming part of Letters Patent No. 119,222, dated September 26, 1871.

*To all whom it may concern:*

Be it known that I, MICHAEL H. COLLINS, of Chelsea, in the county of Suffolk and State of Massachusetts, have invented a new and useful Rotary Machine or Apparatus for Forming Glass Chimneys for Lamps, such apparatus also being useful in the manufacture of various other articles of glass; and I do hereby declare the same to be fully described in the following specification and represented in the accompanying drawing, of which—

Figure 1 denotes a top view, Fig. 2 a side elevation, and Fig. 3 an end elevation of my said invention or apparatus.

My present invention is an improvement upon that patented by me on the 30th day of September, 1867, the main object of which is to so construct and combine the devices employed as to produce an organized machine or apparatus, whereby a glass-blower, without the aid of a stationary mold or solid plug, is enabled with great facility and ease to make any number of glass lamp-chimneys, &c., each of which shall be cylindrical at and above its base, and there have its internal diameter of one uniform size, or both its internal and external diameters of uniform sizes; chimneys of such character being represented in Figs. 4, 5, 6, and 7.

I do not confine my invention to the forming of glass lamp-chimneys, as glass bottles, preserve-jars, and various other articles can be formed thereby with equal facility by simply changing the skeleton-frame and the rollers or rods $g$ to the required form; nor do I confine myself to the particular shape of either the internal or external forming devices, as described, so long as they are properly formed, and by rotation against the surfaces of the glass serve to give form thereto. I believe that no one before me ever formed the circular surfaces of glass articles by means of a machine rotating around the inside or outside of the glass, and consider myself the first to invent such a machine.

In Figs. 1, 2, and 3 of the drawing, A denotes what is termed a glass-blower's chair, the same having the form in horizontal section as shown in Fig. 1. B is the frame or table for supporting the main operating parts. The said chair and table are to be made of cast-iron, in order to give strength and firmness and prevent any warping thereof, the same being supported on legs C C, &c. D D' are the arms of the chairs, which are also made of cast-iron and firmly secured to the chair. These arms are disposed transversely on the chair and decline toward the front, and each at its front end is provided with a vertical projection or centralizing-guide, $a$ or $a'$, the object of these guides being to bring the axis of the tube or blow-pipe (when placed on the arms of the chair and in contact with such guides) in a line coincident with the axis of the skeleton-frame or rotary arbor thereof, to be hereinafter described. If desirable, one or both of the guides may be furnished with friction-rollers. E is an arbor or shaft, which is arranged above the frame B and longitudinally thereof, and supported in bearings made in the uprights F F', as shown in Figs. 1 and 2. On the inner end of the said arbor I affix concentrically, and at a right angle thereto, a metallic head or disk, G. To one face of this disk I affix a skeleton-frame or series of wires, $b$ $b$ $b$, and each of which is disposed in a plane parallel with the axis of the arbor prolonged, and fixed at one of its ends to the disk, its other end being curved and united with the other wires at a central axial point coincident with the axis of the arbor, the same being as shown at $d$ in Figs. 1 and 2; such point serving to open and spread the glass. The said wires are to be disposed at equal distances apart and fastened to the disk at a short distance from its periphery, as at $c$ in said figures. H is another head or disk, arranged concentrically upon the arbor E, and has a series of spring-arms, $e$ $e$, &c., extending therefrom, each of which carries a friction-roller, $g$, the same being disposed so as to stand with respect to the skeleton-frame or wires $b$ as shown in Figs. 1 and 2. In order to bring the said rollers in proper position with reference to the series of wires $b$ when the apparatus is in use, I make use of a clamp, I, which consists of a metallic plate so formed and applied as to embrace the series of arms $e$. The lower part of the said clamp is affixed to a slide-rod, suitably supported in bearings near the top of the table B, such rod being provided with a handle, J, so disposed as to enable the workman while sitting upon the chair to manipulate the clamp or open and close the rollers, as may be desirable. $i$ is an adjustable stop disposed upon the rod J, the same being to arrest the movement of the clamp when the rollers are brought into parallelism with the wires $b$.

I would remark that, instead of the said rollers, a series of round or flat bars, or curved ribs or plates, may be employed; so, also, in case a perfectly-straight cylindrical chimney is to be made, the rods or rollers may be fixed to the disk of the skeleton-frame, and so as to stand parallel with the wires $b$; but I prefer, in all cases, to have the said rollers or rods so applied as to open and close, this being especially requisite where the diameter of the chimney is not uniform throughout, in order to allow the mass of glass to form the chimney to be entered between the skeleton-frame $b$ and the rollers $g$, and removed therefrom after the chimney or article has been formed. I' is a grooved pulley fixed upon the arbor E to receive a band from any suitable motor, and thereby impart rotation to the rollers $g$ and the wires $b$. I would remark that the said skeleton-frame or wires $b$ may be so constructed and applied as to open from and close toward each other, if desirable. The said skeleton-frame $b\ b\ b$ and the series of rods or rollers $g$ may be used independently of the chair, and so disposed upon their table as to stand vertically. In forming chimneys or other articles in which a uniformity of their internal diameters is not of importance, the internal formers or series of wires $b$ may be dispensed with; the mass of glass on the tube being blown and shaped in the ordinary manner, but with its end unopened, is to be thrust into the opening between the series of rollers or rods $g$, and the latter compressed or brought into their proper position; next, by blowing into the tube the glass will be forced out against the rollers, which, rapidly revolving, will give the desired external diameter to the glass article; and if the article is to have no bottom, each roller or bar may be provided with a cutter arranged near its lower end, as shown in Fig. 8, the object of such being to cut off or partially sever the bottom or surplusage of the glass from the chimney; so, also, a cutter may be applied near the top of each roller, bar, or plate, to cut off or partially sever the surplusage at the top of the chimney; so, also, where the uniformity of the external diameter is not requisite, the series of rollers or rods $g$ may be laid aside, and the mass of glass blown out to the proper diameter, as before mentioned, is to have its end opened and the hollow mass thrust upon the skeleton-frame, which, rapidly revolving, will give to it its internal form. This method, however, requires more skill and care. My apparatus is also especially adapted to forming the mouth and lips of bottles or other articles having a bottom, giving such a uniformity of diameter. In doing this, after the neck and body of the bottle have been shaped the workman, by means of a punter-rod attached to the bottom of the bottle, reheats the neck-portion, when the same is to be thrust upon the central former $b$, which, being in revolution, forms the mouth; the rollers, being of the proper form, give the required shape to the lips. I would further remark that each roller or rod $g$ may have a cutter applied near its top, as well as near its bottom, by which the chimney may be cut off or finished at one operation.

Although the devices for forming the inner and outer diameters may be used separately, as has been stated, I prefer to use them in combination, as such is productive of better results.

In using the machine or apparatus as shown for forming both the internal and external diameters of one uniformity, a workman, after having gathered on his tube a mass of glass and blown and formed it into the proper shape in the ordinary manner, cuts off the outer end of the avoidal mass and reheats the said mass and places such tube, with the mass so heated, on the arms of the chair in front of the operator who is to form the chimney; the latter grasps the tube, and, keeping it constantly rotating to preserve the glass in its proper position, with his tool opens or enlarges the outer end of the glass a little. This having been done, he pushes it quickly upon the skeleton-frame and compresses the rollers $g$ into their proper position, so as to impinge against the glass and force the same in contact with the wires $b$, (the said wires and rollers being supposed to be in rapid revolution;) and thus, by the combined action of the skeleton-frame and the series of rods or rollers, the glass will be rendered cylindrical both internally and externally at and above its base.

I would remark that when it is desired to form a chimney bulging near its middle, as shown in Figs. 4, 5, 6, and 7, the rollers or rods to form the outer surface should be so formed as to give the desired contour.

Another modification of my invention which I have contemplated is to so construct and apply the internal series of ribs or wires $b$ and the outer series of rollers or rods $g$ that each shall rotate in opposite directions.

By the employment of my apparatus a great saving of time is effected in comparison with the ordinary method of forming chimneys.

I do not herein claim the invention as shown and described in Letters Patent granted to me on September 3, 1867, or any part thereof, as my present invention, although involving some features of the patented one, has other elements combined with it which render the latter invention one of much greater effectiveness and value.

Having described my invention, what I claim is—

1. The above-described organized instrumentality or apparatus, consisting of the chair A, provided with arms, or arms and tube-guides $a\ a'$, as specified, the skeleton-frame $b\ b\ b$ or the rollers $g$, or both the frame and rollers, when the said frame or rollers, or both the frame and rollers, are mounted upon a shaft supported in suitable bearings and furnished with means of rotation, as stated, the whole being arranged and for use with a glass-blower's tube or rod, as and for the purpose set forth.

2. The skeleton-frame or series of wires $b\ b\ b$, the rollers $g$, the disk G, and the arbor E, the whole being mounted upon the frame B and combined with means of rotation, substantially as set forth, and for use with a glass-blower's pipe, as explained.

3. The series of rods or rollers $g$, the disk G, and arbor E, all mounted upon the frame B, in combination with means or mechanism for putting the same in rotation, such being for use with a glass-blower's rod or tube, as and for the purpose set forth.

4. The skeleton-frame or ribs $b\ b\ b$ and the disk G when mounted upon a rotary arbor, and for use with a glass-blower's rod or tube, as and for the purpose stated.

5. The adjustable clamping mechanism, as described, in combination with the series of rollers or rods $g$ and the disk G, as and for the purpose described.

6. In combination with the skeleton-frame and the rollers $g$ when mounted upon a rotary shaft and provided with means of rotation, as specified, one or more supports or guides $a\ a'$ for centralizing the glass-blower's rod or tube, when used with the same, as set forth.

7. In combination with the skeleton-frame when mounted upon a rotary shaft and provided with means of rotation, as stated, one or more supports or guides, $a\ a'$, as shown and described, and for the purpose set forth.

8. In combination with the rollers $g$ when mounted upon a rotary shaft and provided with means of rotation, as described, one or more supports or guides, $a\ a'$, as and for the purpose specified.

9. In a rotary glass-forming machine in which the outer surface of a glass-blown article is formed by rotating the rollers or forming devices against such surface, the combination of one or more cutters, as and for the purpose set forth.

M. H. COLLINS.

Witnesses:
W. G. RUSSELL,
J. E. ROBB.

(41)